US011490232B2

(12) United States Patent
Mummidi et al.

(10) Patent No.: US 11,490,232 B2
(45) Date of Patent: Nov. 1, 2022

(54) LOCATION-BASED CONVERSATION IDENTIFIER

(71) Applicant: Microsoft Technology Licensing, LLC, Redmond, WA (US)

(72) Inventors: Lakshmi Narayana Mummidi, Bellevue, WA (US); Arindam Biswas, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1082 days.

(21) Appl. No.: 15/224,848

(22) Filed: Aug. 1, 2016

(65) Prior Publication Data
US 2018/0035269 A1 Feb. 1, 2018

(51) Int. Cl.
| | |
|---|---|
| *H04W 4/21* | (2018.01) |
| *H04W 4/029* | (2018.01) |
| *G06F 40/279* | (2020.01) |
| *H04L 51/222* | (2022.01) |
| *G10L 15/08* | (2006.01) |
| *H04W 4/02* | (2018.01) |

(52) U.S. Cl.
CPC ............ *H04W 4/21* (2018.02); *G06F 40/279* (2020.01); *G10L 15/08* (2013.01); *H04L 51/222* (2022.05); *H04W 4/02* (2013.01); *H04W 4/029* (2018.02)

(58) Field of Classification Search
CPC ......... H04M 2201/40; H04M 3/42221; H04M 2201/42; H04M 2203/401; H04M 15/58; H04M 15/745; H04M 15/765; G10L 15/26; H04L 51/16; H04L 12/2818; H04L 67/02; H04L 51/32; G06F 3/0482; G06F 16/90324; G06Q 10/063; G06Q 20/32; G06Q 50/01

USPC ................. 707/602, 776, E17.103, E17.123, 707/E17.724, E17.725, E17.107
See application file for complete search history.

(56) References Cited

U.S. PATENT DOCUMENTS 6,493,703 B1 * 12/2002 Knight ................. G06Q 10/107
6,615,258 B1 * 9/2003 Barry .................. G06F 11/0709
709/223

(Continued)

FOREIGN PATENT DOCUMENTS

| | | |
|---|---|---|
| EP | 1 067 731 A2 | 1/2001 |
| WO | 2014198132 A1 | 12/2014 |

OTHER PUBLICATIONS

"International Search Report and Written Opinion Issued in PCT Application No. PCT/US2017/043571", dated Sep. 11, 2017, 11 Pages.

(Continued)

*Primary Examiner* — Alex Gofman
*Assistant Examiner* — Linh Black
(74) *Attorney, Agent, or Firm* — Christopher J. Volkmann; Kelly, Holt & Christenson, PLLC

(57) ABSTRACT

A set of conversations taking place by users within a geographic location are identified. Keywords for a conversation under analysis, in that geographic location, are identified based on a frequency with which terms are used in the conversation under analysis and in the related conversations. The keywords are automatically added as searchable terms corresponding to the conversation under analysis, and a communication system is controlled to notify client components of the keywords.

19 Claims, 9 Drawing Sheets

(56) References Cited

U.S. PATENT DOCUMENTS

| | | | | |
|---|---|---|---|---|
| 8,312,380 | B2* | 11/2012 | Churchill | G06F 3/0481 |
| | | | | 379/265.01 |
| 8,315,849 | B1* | 11/2012 | Gattani | G06F 17/28 |
| | | | | 704/2 |
| 8,370,145 | B2 | 2/2013 | Endo et al. | |
| 8,458,115 | B2 | 6/2013 | Cai et al. | |
| 8,560,568 | B2* | 10/2013 | Gilder | G06F 16/273 |
| | | | | 707/770 |
| 8,612,380 | B2* | 12/2013 | Kleppner | G06F 17/24 |
| | | | | 707/608 |
| 8,639,214 | B1* | 1/2014 | Fujisaki | G06Q 20/32 |
| | | | | 379/88.03 |
| 8,725,717 | B2 | 5/2014 | Bernstein et al. | |
| 8,972,396 | B1* | 3/2015 | Zhang | G06F 16/3346 |
| | | | | 707/731 |
| 9,544,212 | B2* | 1/2017 | Zalmanovitch | H04L 43/045 |
| 9,557,889 | B2* | 1/2017 | Raleigh | G06F 3/0482 |
| 9,626,629 | B2* | 4/2017 | Vijayaraghavan | G06N 99/005 |
| 2002/0188681 | A1* | 12/2002 | Gruen | G06Q 10/107 |
| | | | | 709/204 |
| 2006/0004561 | A1* | 1/2006 | Zhang | G06F 16/355 |
| | | | | 704/4 |
| 2008/0112551 | A1* | 5/2008 | Forbes | H04W 76/10 |
| | | | | 379/142.1 |
| 2008/0177994 | A1* | 7/2008 | Mayer | G06F 9/4418 |
| | | | | 713/2 |
| 2008/0183828 | A1 | 7/2008 | Sehgal et al. | |
| 2008/0214148 | A1* | 9/2008 | Ramer | G06Q 30/02 |
| | | | | 455/414.1 |
| 2008/0313180 | A1 | 12/2008 | Zeng et al. | |
| 2010/0076994 | A1* | 3/2010 | Soroca | G06F 16/68 |
| | | | | 707/769 |
| 2010/0293170 | A1* | 11/2010 | Hall | H04L 51/32 |
| | | | | 707/750 |
| 2011/0035284 | A1* | 2/2011 | Moshfeghi | G06Q 30/02 |
| | | | | 705/14.58 |
| 2011/0131207 | A1* | 6/2011 | Jonsson | G06Q 10/107 |
| | | | | 707/730 |
| 2012/0197988 | A1* | 8/2012 | Leppanen | G06Q 50/01 |
| | | | | 709/204 |
| 2013/0073473 | A1* | 3/2013 | Heath | G06Q 30/02 |
| | | | | 705/319 |
| 2013/0110565 | A1* | 5/2013 | Means, Jr. | G06Q 10/06 |
| | | | | 705/7.11 |
| 2013/0132854 | A1* | 5/2013 | Raleigh | G06F 3/0482 |
| | | | | 715/738 |
| 2013/0185308 | A1 | 7/2013 | Itoh et al. | |
| 2013/0268357 | A1* | 10/2013 | Heath | H04L 63/00 |
| | | | | 705/14.53 |
| 2013/0282589 | A1* | 10/2013 | Shoup | G06F 21/34 |
| | | | | 705/67 |
| 2014/0006310 | A1* | 1/2014 | Hamilton, II | G06Q 30/02 |
| | | | | 705/347 |
| 2015/0003595 | A1* | 1/2015 | Yaghi | G06Q 10/063 |
| | | | | 379/85 |
| 2015/0026192 | A1 | 1/2015 | Kamerman et al. | |
| 2015/0112963 | A1* | 4/2015 | Mojtahedi | G06F 16/9537 |
| | | | | 707/711 |
| 2015/0120782 | A1* | 4/2015 | Kim | H04L 67/10 |
| | | | | 707/798 |
| 2016/0029368 | A1* | 1/2016 | Borenstein | H04W 4/02 |
| | | | | 709/205 |
| 2017/0078922 | A1* | 3/2017 | Raleigh | H04W 28/10 |
| 2017/0147696 | A1* | 5/2017 | Evnine | G06F 16/9535 |

OTHER PUBLICATIONS

Bengel, et al., "ChatTrack: Chat Room Topic Detection Using Classification", In Proceedings of Intelligence and Security Informatics, Second Symposium on Intelligence and Security Informatics, Jun. 10, 2004, 10 pages.

Kim, et al., "Extracting Keywords from Multi-party Live Chats", In Proceedings of 26th Pacific Asia Conference on Language, Information and Computation, Nov. 8, 2012, pp. 199-208.

Adams, et al., "Topic Detection and Extraction in Chat", In Proceedings of the 2th IEEE International Conference on Semantic Computing, Aug. 4, 2008, pp. 581-588.

Sood, Arpit, "Towards Summarization of Written Text Conversations", In Thesis of Master of Science of International Institute of Information Technology, Jun. 2013, 70 pages.

Boulis, Constantinos, "Topic Learning in Text and Conversational Speech", In Thesis of Doctor of Philosophy of University of Washington, Retrieved on: Jun. 23, 2016, 162 pages.

Joty, et al., "Topic Segmentation and Labeling in Asynchronous Conversations", In Journal of Artificial Intelligence Research, vol. 47, Jul. 2013, pp. 521-573.

Hui, et al., "Text Mining for Chat Message Analysis", In Proceedings of IEEE Conference on Cybernetics and Intelligent Systems, Sep. 21, 2008, 411-416.

Dong, et al., "Structural Analysis of Chat Messages for Topic Detection", In Journal Online Information Review, vol. 30, No. 5, May 2, 2006, pp. 1-33.

Feng, et al., "Learning to Detect Conversation Focus of Threaded Discussions", In Proceedings of the main conference on Human Language Technology Conference of the North American Chapter of the Association of Computational Linguistics, Jun. 4, 2006, 8 pages.

Wang, et al., "Instant Message Clustering Based on Extended Vector Space Model", In Proceedings of Advances in Computation and Intelligence, Second International Symposium, Sep. 21, 2007, pp. 435-443.

\* cited by examiner

LOCATION-BASED CONVERSATION IDENTIFIER

BACKGROUND

Computing systems are currently in wide use. Some such computing systems include communication systems that allow various users to communicate with one another.

For example, one such communication system is a location-based conversation system. Users with mobile devices can download a client component that intermittently communicates the location of the mobile device to the location-based conversation system. The location-based conversation system sends notifications to the mobile device of conversations that users are having, in the geographic region of the user. For instance, if a user is attending a sporting event at a stadium, the geographic location of the stadium is illustratively known to the location-based conversation system. Users that have the client component on their mobile devices, and who are in the stadium (or perhaps within a threshold distance of the stadium, such as one kilometer, or a different threshold) receive notifications from the location-based conversation system identifying different conversations that other users in that same location are having, in the location-based conversation system. The users may then illustratively actuate a user input mechanism to view the various messages in the different conversations that are taking place, by other users, at their location. The users can participate in the conversation by posting messages, or they can start new conversations.

Even at a single geographic location, users may be engaging in multiple different conversations. For instance, in the example where the geographic location is a stadium, it may be that users are in different conversations about a certain team, or a certain player on a team. It may be that users in the stadium are also in a conversation about the opposing team, about events taking place after the sporting event, or about a wide variety of other subject matter. Each of these conversations may be a separately identified conversation that users, in that geographic location, can participate in.

The discussion above is merely provided for general background information and is not intended to be used as an aid in determining the scope of the claimed subject matter.

SUMMARY

A set of conversations taking place by users within a geographic location are identified. Keywords for a conversation under analysis, in that geographic location, are identified based on a frequency with which terms are used in the conversation under analysis and in the related conversations. The keywords are automatically added as searchable terms corresponding to the conversation under analysis, and a communication system is controlled to notify client components of the keywords.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
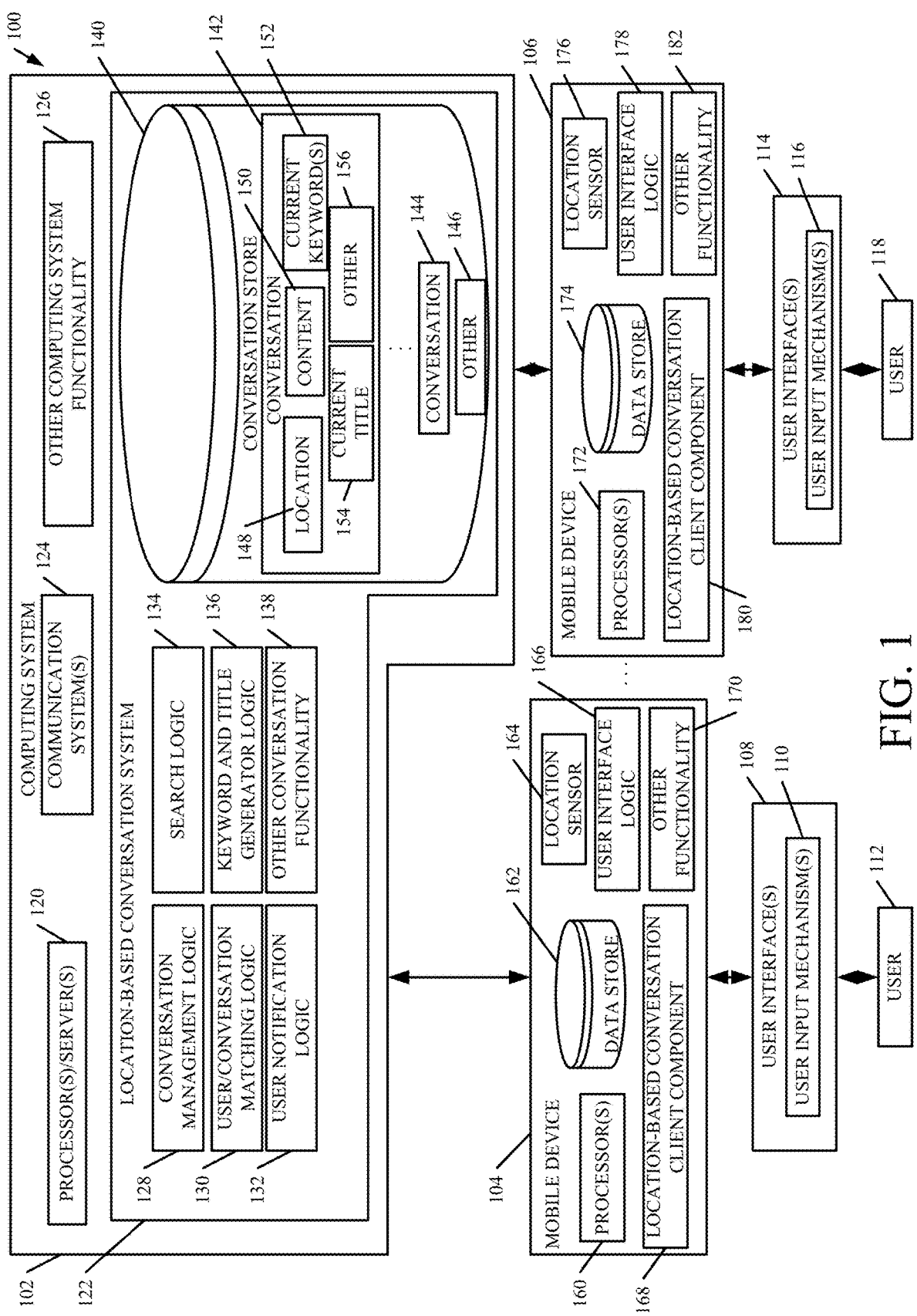
FIG. 1 is a block diagram of one example of a computing system architecture.

FIG. 1 is a block diagram of one example of a computing system architecture 100. Architecture 100 illustratively includes computing system 102, that is shown communicating with a plurality of different mobile devices 104-106. Mobile device 104 illustratively generates user interfaces 108 with user input mechanisms 110 for interaction by user 112. User 112 illustratively interacts with user input mechanisms 110 in order to control and manipulate mobile device 104, and to interact with computing system 102.

Similarly, mobile device 106 is shown generating user interfaces 114 with user input mechanisms 116 for interaction by user 118. User 118 illustratively interacts with user input mechanisms 116 in order to control and manipulate mobile device 106, and in order to interact with computing system 102.

It will be noted that, in the example shown in FIG. 1, only two mobile devices 104 and 106 are in communication with computing system 102. This is by way of example only, and a wide variety of additional mobile devices can be in communication with computing system 102 as well. Similarly, mobile devices 104 and 106 are shown in direct connection with computing system 102. This is also by way of example only. They can also be connected over a network, such as a wide area network, a local area network, a near field communication network, a cellular network, or a wide variety of other networks. Some examples of these are described in greater detail below.

In the example shown in FIG. 1, computing system 102 illustratively includes one or more processors or servers 120, location-based conversation system 122, communication systems 124, and it can include a wide variety of other computing system functionality 126. Location-based conversation system 122 illustratively includes conversation management logic 128, user/conversation matching logic 130, user notification logic 132, search logic 134, keyword and title generator logic 136, and it can include other conversation functionality 138.

System 122 also illustratively includes conversation store 140. Conversation store 140 can store a plurality of different conversations 142-144, and it can store a wide variety of other items 146, as well. Each conversation 142-144 illustratively has a corresponding location identifier 148, that identifies a particular geographic location within which users, participating in the corresponding conversation, are currently located. Each conversation can also include conversation content 150, which may comprise messages (such as anonymous messages) that users 112-118 are adding to the conversation 142. Each conversation can include one or more keywords 152 that are generated, as described below, based upon the frequency of terms used in the conversation 142, and in related conversations (such as other conversations that users are having in the same geographic location as conversation 142). The conversations also illustratively include a current title 154 that can be generated by a user participating in the conversation, or automatically. One example of how the title is generated or modified automatically, based upon the content of the conversation, is described in greater detail below. The conversations can include a wide variety of other things 156, as well.

The example shown in FIG. 1 also shows that mobile device 104 illustratively includes one or more processors 160, a data store 162, a location sensor 164, user interface logic 166, location-based conversation client component 168, and it can include other functionality 170. Similarly, mobile device 106 can include one or more processors 172, data store 174, location sensor 176, user interface logic 178, location-based conversation client component 180, and it can include other functionality 182. Mobile devices 104 and 106 can be similar, or different. For the sake of the present discussion, it will be assumed that they are similar devices so that the discussion of components in mobile device 104 can just as easily apply to mobile device 106.

Before describing the overall operation of architecture 100 in more detail, a brief discussion of some of the items in architecture 100, and their operation, will first be provided. Communication systems 124 illustratively communicate with one or more mobile devices 104-106. They can include a wide variety of different types of communication systems, and they can communicate with other computing systems (not shown) as well.

Conversation management logic 128 illustratively manages a variety of different location-based conversations. It can control system 122 to generate user interfaces with user input mechanisms so users 112-118 can start new conversations or participate in existing conversations.

User/conversation matching logic 130 receives location information from mobile devices 104-106 indicating where they are geographically located. It also accesses conversations 142-144 in conversation store 140 to identify which particular conversations are being conducted at that location, based on the location identifier 148 corresponding to each of the conversations. Conversation management logic 128 allows the users that have been matched with various conversations (e.g., the users in the same geographic location) to post various messages in those conversations. They can participate in other ways as well.

User notification logic 132 notifies other users, in the same geographic location, of the conversations that are taking place in that user's geographic location. It can also notify those users of any new messages that are being posted, to the conversations, of the title of the conversations, etc.

Search logic 134 allows users 112-118 to search for various conversations 142-146 by entering search terms. Search logic 134 illustratively identifies related conversations (that are related to the search terms) based upon the keywords 152 for each of the conversations being conducted in the user's geographic location, and returns the search results, identifying those conversations, for surfacing to the user.

In some prior systems, the users participating in a conversation, themselves, needed to update the keywords 152 for that conversation, as the subject matter of that conversation shifted over time. Similarly, the users, themselves, needed to update the title of any given conversation. To the extent that users did not actively update the keywords or title for a conversation, then search logic 134 did not provide accurate search results when a user was searching for a particular conversation, having a particular subject matter. Similarly, the title for the conversation did not accurately reflect the content of the conversation, as the subject matter of the conversation shifted.

Therefore, keyword and title generator logic 136, continuously or intermittently, analyzes the content 150 of the various conversations in which users are participating, and updates the keywords associated with those conversations, based upon the actual content of the messages. In doing so, it illustratively identifies other, related, conversations and bases the keywords identified for a conversation being analyzed not only on the terms in that conversation, itself, but also on the terms in the related conversations. In one example, the related conversations are selected as the conversations that are taking place in the same geographic location as the conversation under analysis. One example of how the keywords are identified is discussed in greater detail below with respect to FIGS. 2 and 3.

Similarly, in one example, logic 136 also modifies the title of each of the conversations to reflect the current content of the conversations as well. Therefore, even if a user starts a conversation and gives it a particular title, the subject matter content of the conversation may shift so that the title of the conversation should shift. Instead of requiring users to update the keywords and title corresponding to the conversations, logic 136 detects when an update should be performed and does it automatically.

A brief description of some of the items in mobile devices 104 and 106 will now be provided. The location sensors 164 and 176 in mobile devices 104 and 106 illustratively provide an indication of the geographic location of the corresponding mobile device. For instance, they can be GPS receivers, components that identify geographic location based upon cellular triangulation, based upon dead reckoning, or a wide variety of other location sensors.

User interface logic 166 and 178 in mobile devices 104 and 106 illustratively generate user interfaces 108 and 114, respectively, and also detect user interaction with the user input mechanisms 110 and 116, and with other user input mechanisms. They can provide the detected user interactions to other items in the mobile devices, or they can perform various different types of processing based upon those detected interactions as well.

Location-based conversation client components 168 and 180 illustratively generate user interfaces that allow users 112 and 118, respectively, to view and post messages to location-based conversation system 122. Components 168 and 180 also illustratively, and either continuously or intermittently, provide the location from location sensors 164 and 176, to location-based conversation system 122 as well. Client components 168 and 180 can receive user notifications from user notification logic 132 and components 168 and 180 can interact with location-based conversation system 122 in other ways as well (such as in allowing a user to start a conversation, to title a conversation, to add keywords to a conversation, to use search logic 134 to search for various conversations in their geographic location, etc.).

Figure 2:
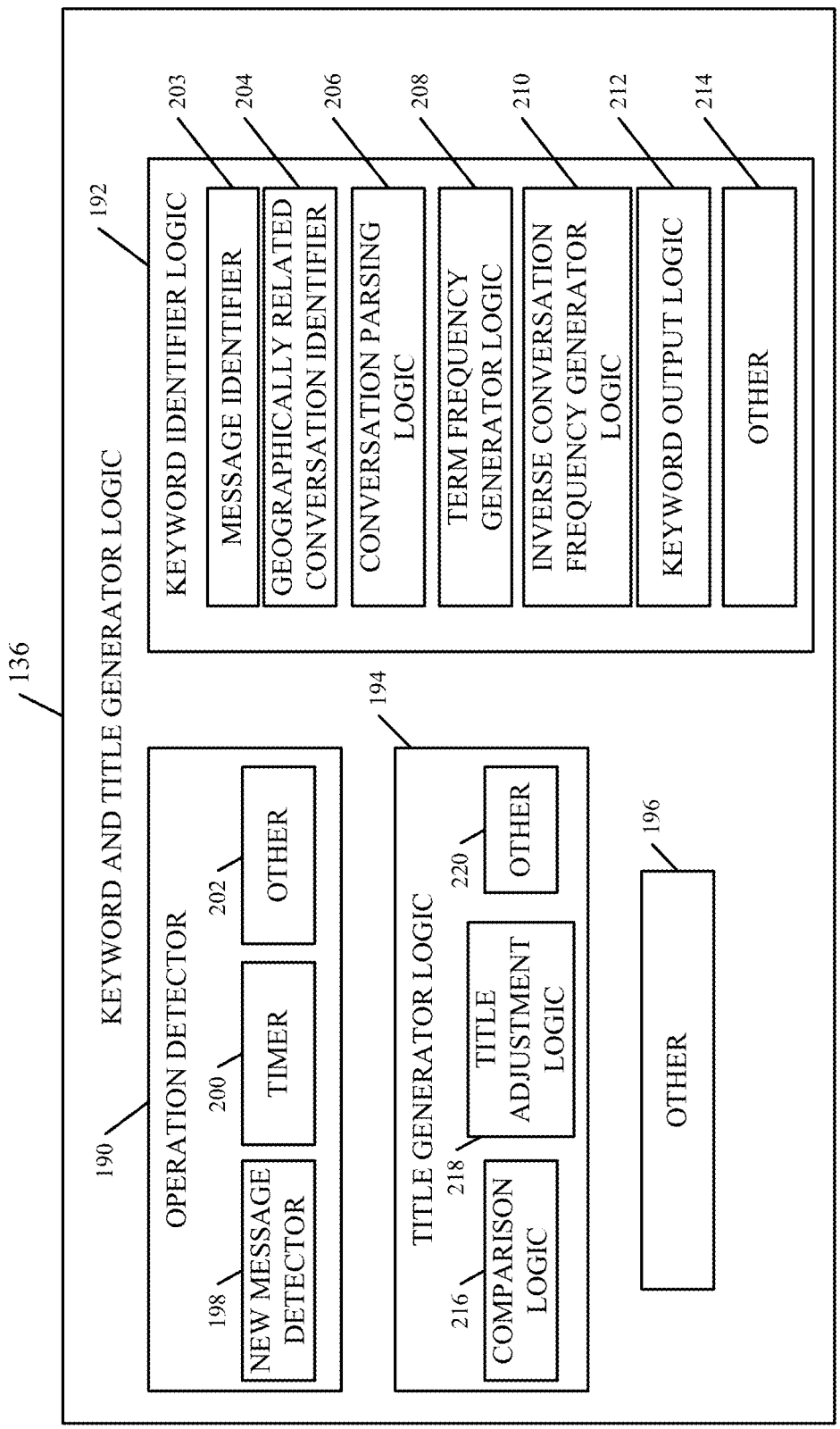
FIG. 2 is a block diagram showing one example of keyword and title generator logic, in more detail.

FIG. 2 is a block diagram showing one example of keyword and title generator logic 136, in more detail. Logic 136 illustratively includes operation detector 190, keyword identifier logic 192, title generator logic 194, and it can include other items 196. Operation detector 190 illustratively detects when keywords are to be identified or revised for a conversation, and/or when a title is to be generated or revised. It can do this in a wide variety of ways. For instance, new message detector 198 can detect when a new message has been posted to a conversation. Timer 200 can detect how much time has elapsed since the last time keywords were updated, or a title was updated, for the conversation. Either or both of these can be used to detect when it is time to update keywords or the title. Detector 190 can include other items 202 as well.

Keyword identifier logic 192 illustratively includes identifier 203, and geographically related conversation identifier 204. In one example, when keywords or a title are to be updated for a conversation under analysis, the new keywords or title will be based on the current subject matter content of the conversation. Therefore, it may be that only recent messages are analyzed for their subject matter content. Message identifier 203 thus identifies the particular messages in the conversation under analysis that are to be used in the analysis.

Also, in one example, geographically related conversation identifier 204 identifies related conversations, that are related to the conversation under analysis. In one example, they are geographically related conversations, in that they are conversations taking place by users within the same geographic location as the conversation under analysis. Logic 192 also includes conversation parsing logic 206 that parses various conversations and messages into linguistic units. Term frequency generator logic 208 generates a term frequency value for the linguistic units and inverse conversation frequency generator logic 210 generates an inverse conversation frequency based on linguistic units in the related conversations. These are described in greater detail below. Keyword output logic 212 identifies and outputs keywords for a conversation under analysis based upon the frequency of the keywords used in the conversation under analysis and used in the related conversations. Logic 192 can include other items 214 as well.

Title generator logic 194 illustratively includes comparison logic 216 that compares a current title of a conversation to the keywords identified for that conversation. Title adjustment logic 218 determines whether the title accurately reflects the content of the conversation, based upon the newly-identified keywords. If not, it adjusts the title accordingly. Logic 194 can include other items 220 as well.

Figure 3A:
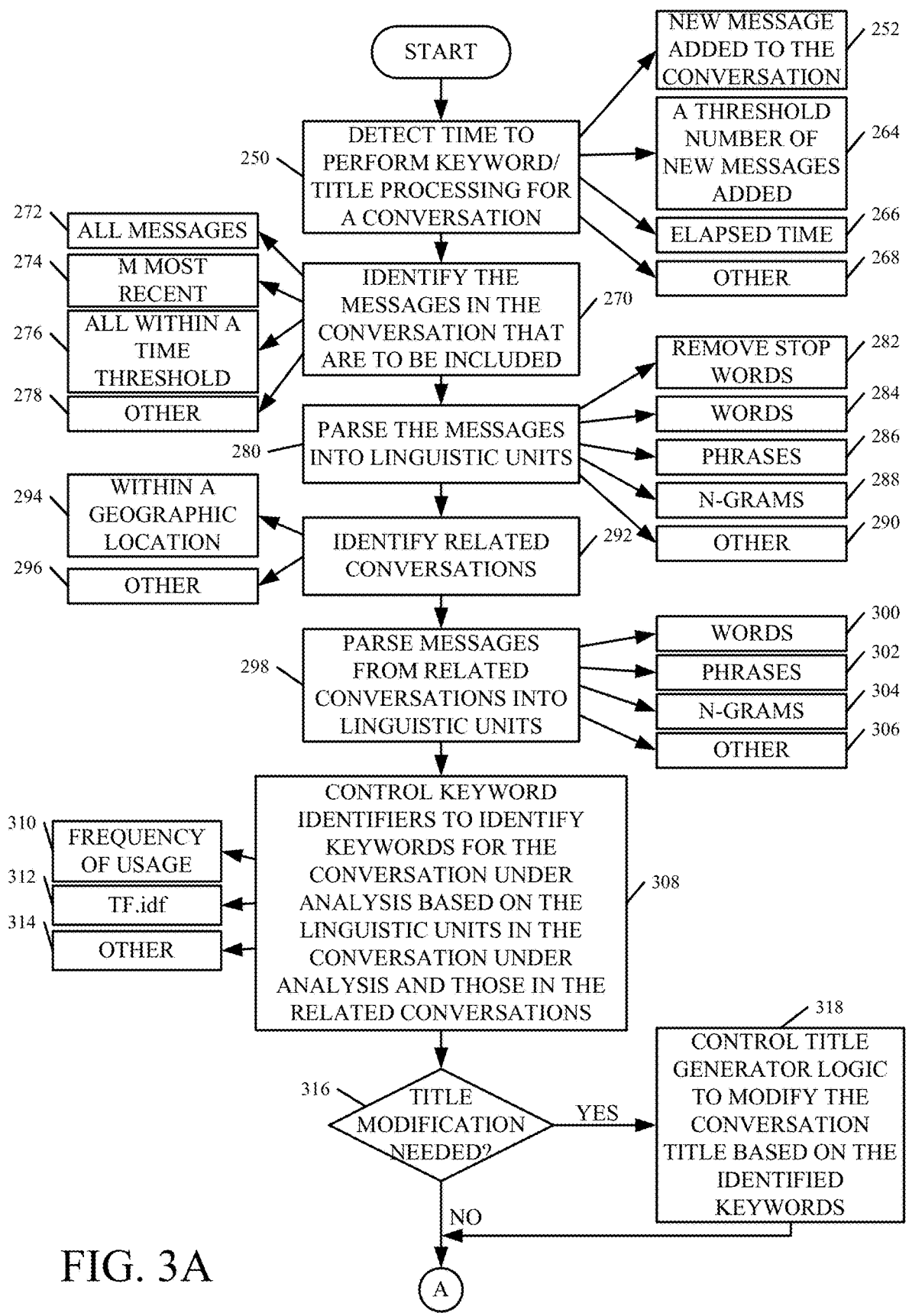
FIGS. 3A and 3B (collectively referred to herein as FIG. 3) show a flow diagram illustrating one example of the operation of the architecture shown in FIG. 1 and the keyword and title generator logic shown in FIG. 2.
Figure 3B:
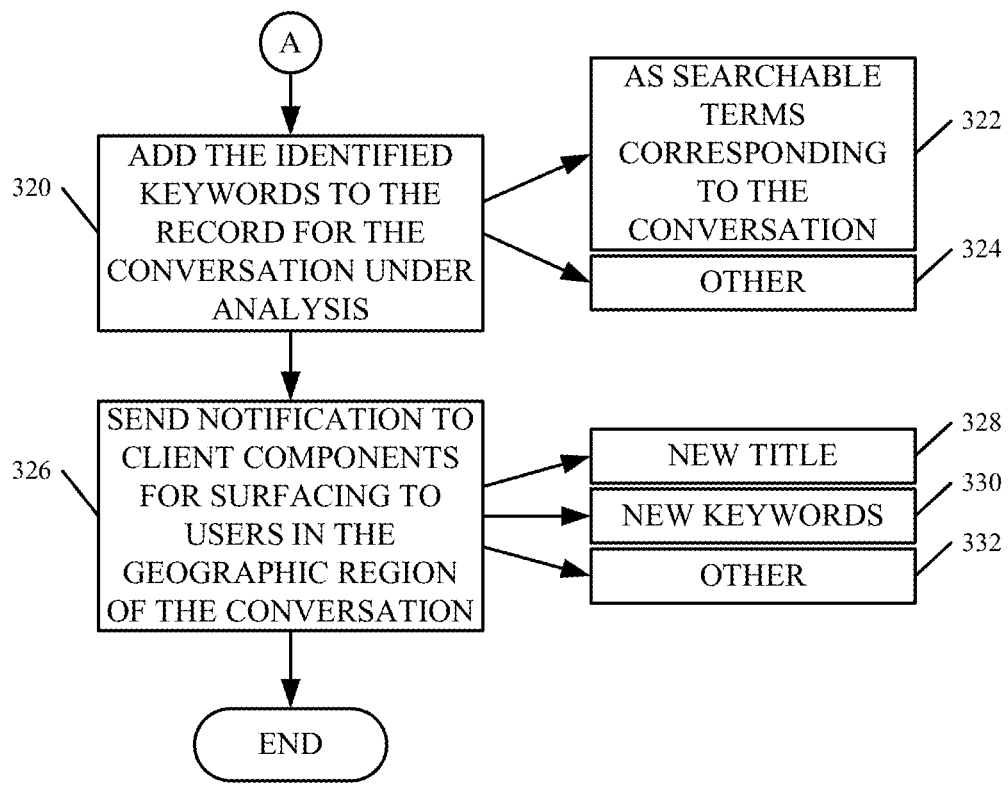

FIGS. 3A and 3B (collectively referred to herein as FIG. 3) show a flow diagram illustrating one example of the operation of architecture 100, and keyword and title generator logic 136, in identifying keywords and adjusting a title for a conversation under analysis, in more detail. Operation detector 190 first detects that it is time to perform keyword and/or title processing for a particular conversation. This is indicated by block 250 in FIG. 3. This can be done in a wide variety of different ways. In one example, new message detector 198 detects when a new message is posted to a conversation, and detector 190 can detect that it is time to modify the keywords and/or title every time a new message is posted. This is indicated by block 252 in FIG. 3. In another example, detector 190 detects that the keywords and/or title are to be updated after a threshold number, n, of new messages have been posted. For example, it may be that a subject matter content of a conversation may not change very much, when only a single new message has been posted. This is because the body of the conversation may still be largely directed to a particular subject matter content, even if the single new message is directed to different subject matter content. Therefore, it may be that detector 190 waits until a threshold number n of new messages are posted to a conversation before updating the keywords and/or title for that conversation. Detecting that a threshold number of new messages have been added to a conversation is indicated by block 264 in the flow diagram of FIG. 3.

It may be that detector 190 detects that it is time to update the keywords and/or title for a conversation after an elapsed time period. This is indicated by block 266. Detector 190 can operate in other ways as well, and this is indicated by block 268.

Once detector 190 indicates that it is time to update the keywords for a conversation under analysis, then message identifier 203 identifies which messages in that conversation are to be analyzed, to identify the new keywords. This is indicated by block 270 in the flow diagram of FIG. 3. For instance, in one example, the linguistic content of all messages 272 in the conversation are considered in identifying the new keywords. However, it may be that, as the subject matter content of a conversation changes over time, only the most recent messages will be reflective of the current subject matter content of the conversation. Therefore, message identifier 203 may identify the m most recent messages 274 as those messages that will be analyzed to identify the subject matter content of the conversation. In another example, message identifier 203 identifies all messages that have been posted to the conversation within a particular time threshold. This is indicated by block 276. For instance, it may be that all messages posted to a conversation within the last hour, 12 hours, day, 15 minutes, or other time threshold will be considered. The thresholds may be predefined or they may change dynamically. Message identifier 203 can identify messages to be considered in determining the keywords and title of a conversation in other ways as well, and this is indicated by block 278.

Conversation parsing logic 206 can be a natural language parser that parses the messages for the conversation under analysis into linguistic units. This is indicated by block 280. In one example, conversation parsing logic 206 includes a word breaker that breaks the messages of the conversation into words and removes the stop words, as indicated by block 282. It can then identify the linguistic units in the messages by identifying words 284, phrases 286, n-grams 288, or a wide variety of other linguistic units 290, in the message being analyzed.

Geographically related conversation identifier 204 then identifies related conversations, that are geographically related to the conversation under analysis. This is indicated by block 292. For instance, it may identify all conversations that are being conducted within a geographic location (such as within a geographic distance of the location of the conversation under analysis). This is indicated by block 294. It can identify related conversations in other ways as well, and this is indicated by block 296.

Conversation parsing logic 206 then parses messages from the related conversations into their linguistic units as well. This is indicated by block 298. Again, it can parse the relevant messages into words 300, phrases 302, n-grams 304, or other linguistic units 306.

System 122 then controls keyword identifier logic 192 to identify keywords for the conversation under analysis based on the linguistic units in the conversation under analysis and those in the related conversations. This is indicated by block 308 in the flow diagram of FIG. 3. In one example, the keywords are identified based upon the frequency of usage of the linguistic units in the conversation under analysis, relative to the frequency of usage of those linguistic units in the related conversations. Identifying the keywords based upon the frequency of usage is indicated by block 310 in the flow diagram of FIG. 3.

In one example, term frequency generator logic 208 identifies the term frequency, which is the frequency of all words (except the stop words, which have been removed)

occurring in the relevant messages in the conversation under analysis. The frequency values can be scaled by dividing them by the frequency of a most frequent word in the conversation under analysis. These frequency values for the linguistic units in the conversation under analysis are referred to as the term frequency (or TF) values. Then, inverse conversation frequency generator logic 210 calculates an inverse conversation frequency (sometimes referred to as an inverse document frequency) value for each of the linguistic units. This value is calculated as the logarithmically scaled fraction of the related conversations that contain that particular linguistic unit (or word). This value (referred to as the IDF value) is obtained by dividing the total number of related conversations by the number of related conversations that contain the word under analysis, and then taking the logarithm of that quotient. As discussed above, while calculating the IDF values, only the geographically related conversations (such as conversations within an n kilometer radius of the conversation under analysis) are considered. The TF-IDF value is then calculated by logic 192, which is the product of the TF and IDF values for each linguistic unit.

A high weight (e.g., a high TF-IDF value) is reached by having a high term frequency (a high frequency of usage of the term within the conversation under analysis) and a low conversation frequency value for the term (a low frequency of use of the linguistic unit in the related conversations). This helps to filter out common terms that may be used quite frequently in all conversations. Identifying the keywords using the TF-IDF mechanism is indicated by block 312 in FIG. 3.

They keywords can be identified in other ways as well. This is indicated by block 314.

In one example, once the TF-IDF values are generated for the linguistic units in the conversation under analysis, the top x words (based on the TF-IDF values) are selected as the keywords for the conversation under analysis.

Title generator logic 194 then determines whether the title of the conversation under analysis needs to be modified, based upon the newly identified keywords. In one example, comparison logic 216 compares the linguistic content of the current title for the conversation under analysis to the newly identified keywords. This can be done using a simple string comparison, using natural language processing to identify whether the meaning of the title is consistent with the meaning of the keywords, or in other ways. If the comparison indicates that the title is no longer descriptive of the subject matter content of the conversation, then the title can be adjusted or modified. Determining whether title modification is needed is indicated by block 316 in FIG. 3.

If it is determined that the title is to be modified, then the system controls title generator logic 194 (and in particular title adjustment logic 218) to modify the title of the conversation based upon the newly identified keywords. This is indicated by block 318. The title is illustratively modified so that its meaning more closely conforms to the subject matter of the content of the conversation, as indicated by the newly identified keywords.

Keyword output logic 212 then adds the identified keywords to the conversation record in data store 140 for the conversation under analysis. In doing so, it can replace older keywords that were previously stored for the conversation, it can simply add the new keywords, or it can eliminate some of the older keywords while adding the new keywords. This is indicated by block 320 in the flow diagram of FIG. 3. In one example, the keywords are added as searchable terms corresponding to the conversation under analysis. This is indicated by block 322. In this way, other users or client components can submit searches for conversations based upon the keywords. The keywords can be added to the conversation under analysis in other ways as well, and this is indicated by block 324.

At some point, user notification logic 132 illustratively sends notifications to the client components 168-180 for all mobile devices that are in the location corresponding to the conversation under analysis. The notification may indicate changes made to the keywords or title for the conversation under analysis, so that they can be surfaced to users in that geographic region. This is indicated by block 326. The notification may identify the new title 328, the new keywords 330, and it may identify other items 332.

It can thus be seen that the present description greatly enhances the accuracy of location-based conversation system 122. It increases the accuracy with which conversations can be represented or surfaced to users of the system. By continuously or intermittently performing a natural language understanding analysis on the content of the various conversations, more accurate keywords can be generated for those conversations and stored so that the conversations can be more accurately identified by client components. In addition, updating the title allows the conversations to be more accurately identified to users, when they are surfaced to the users.

The present description also reduces processing overhead and network bandwidth requirements. For instance, if a user is searching for a particular conversation, having a particular subject matter content, the user may provide search terms. If the keywords do not accurately reflect the subject matter content of a conversation, the user may need to perform multiple different searches in order to identify the desired conversations. Instead, the present system accurately surfaces conversations for a user, in response to a single search, because the title and keywords corresponding to the conversations are maintained accurately. Thus, the processing and memory overhead, as well as the bandwidth requirements for the system can be significantly reduced.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
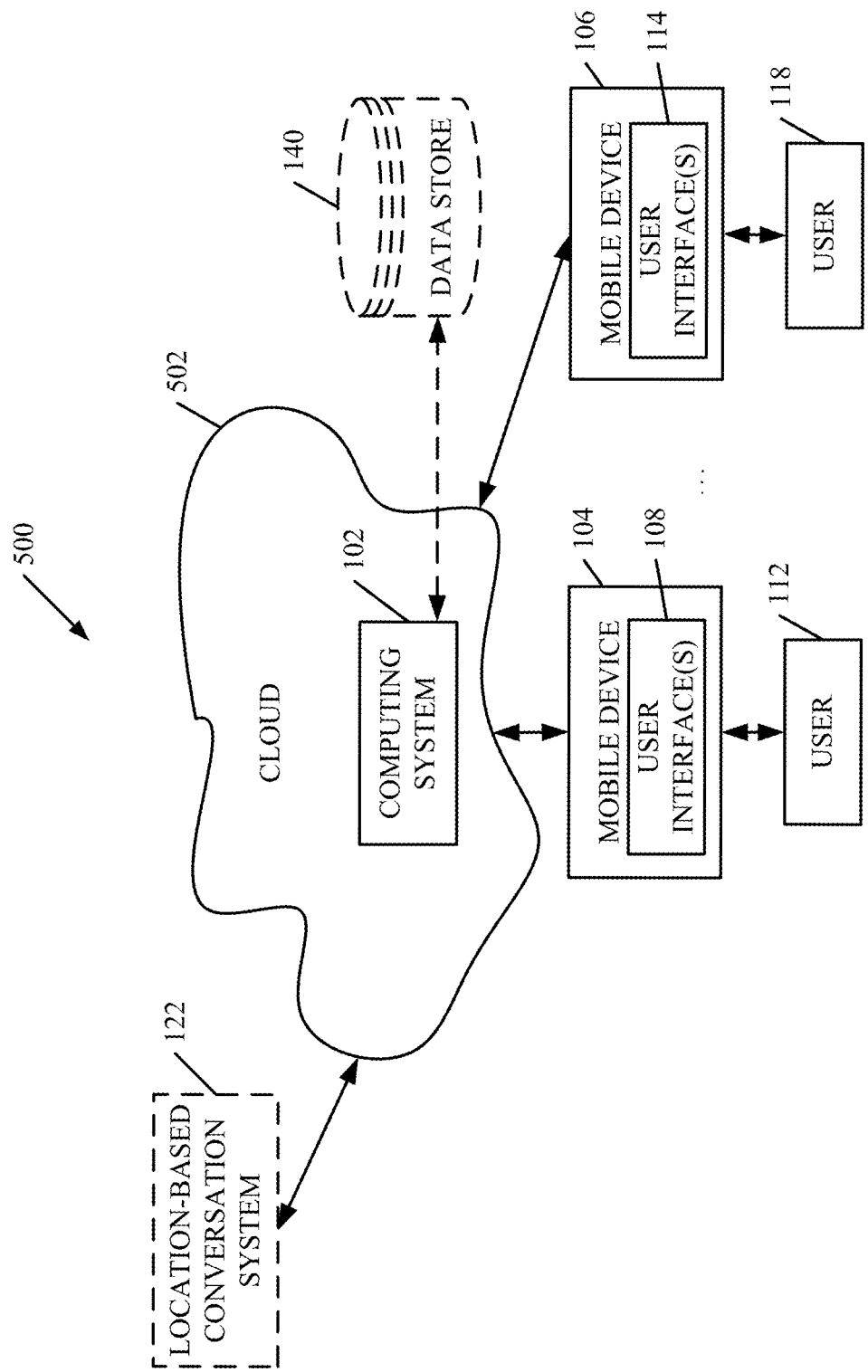
FIG. 4 is a block diagram of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 can be located in cloud 502 (which can be public, private, or a combination where portions are public while others are private). Therefore, users 112 and 118 use mobile devices 104 and 106 to access those systems through cloud 502.

FIG. 4 also depicts another example of a cloud architecture. FIG. 4 shows that it is also contemplated that some elements of computing system 102 can be disposed in cloud 502 while others are not. By way of example, data store 140 can be disposed outside of cloud 502, and accessed through cloud 502. In another example, location-based conversation system 122 can be outside of cloud 502. Regardless of where they are located, they can be accessed directly by devices 104-106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
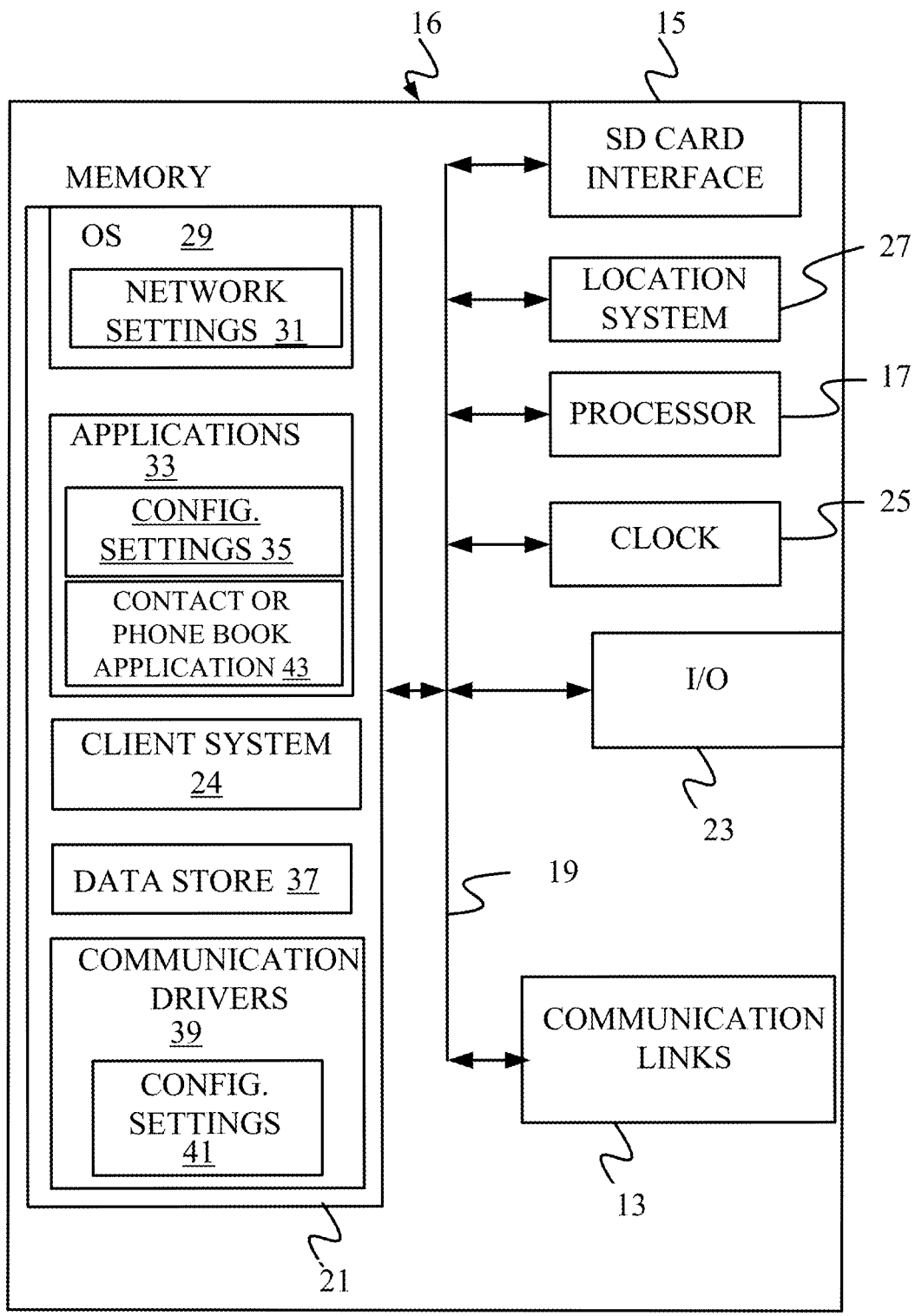
FIGS. 5-7 show examples of mobile devices that can be used in the architectures shown in the previous figures.
Figure 6:
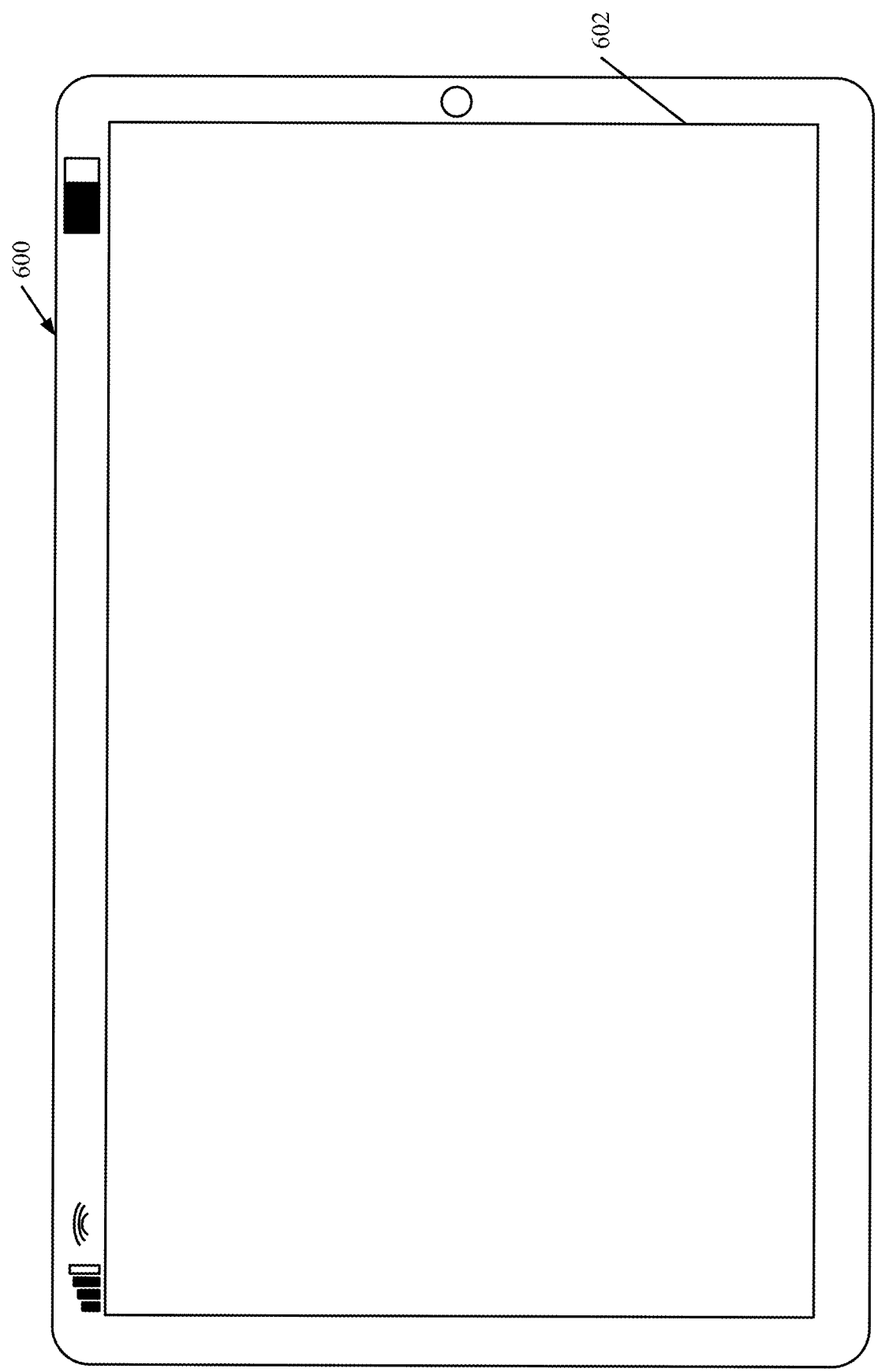
Figure 7:
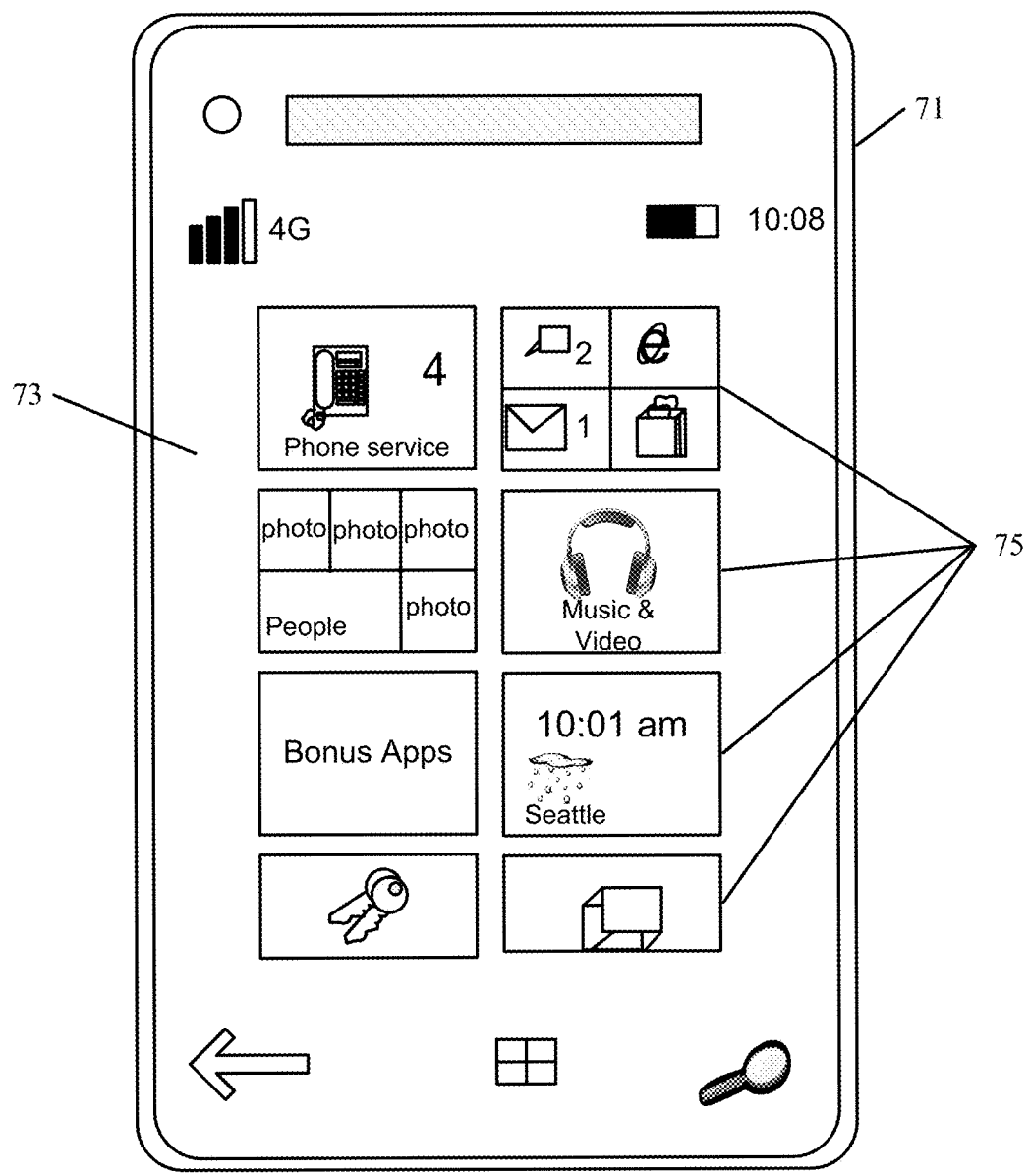

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of computing system 102, or mobile devices 104-106 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 160 or 172 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system.

It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 (which can be systems 168 and 180) which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 (e.g., mobile devices 104 and 106) is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the devices (e.g., devices 104 and 106) can each be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
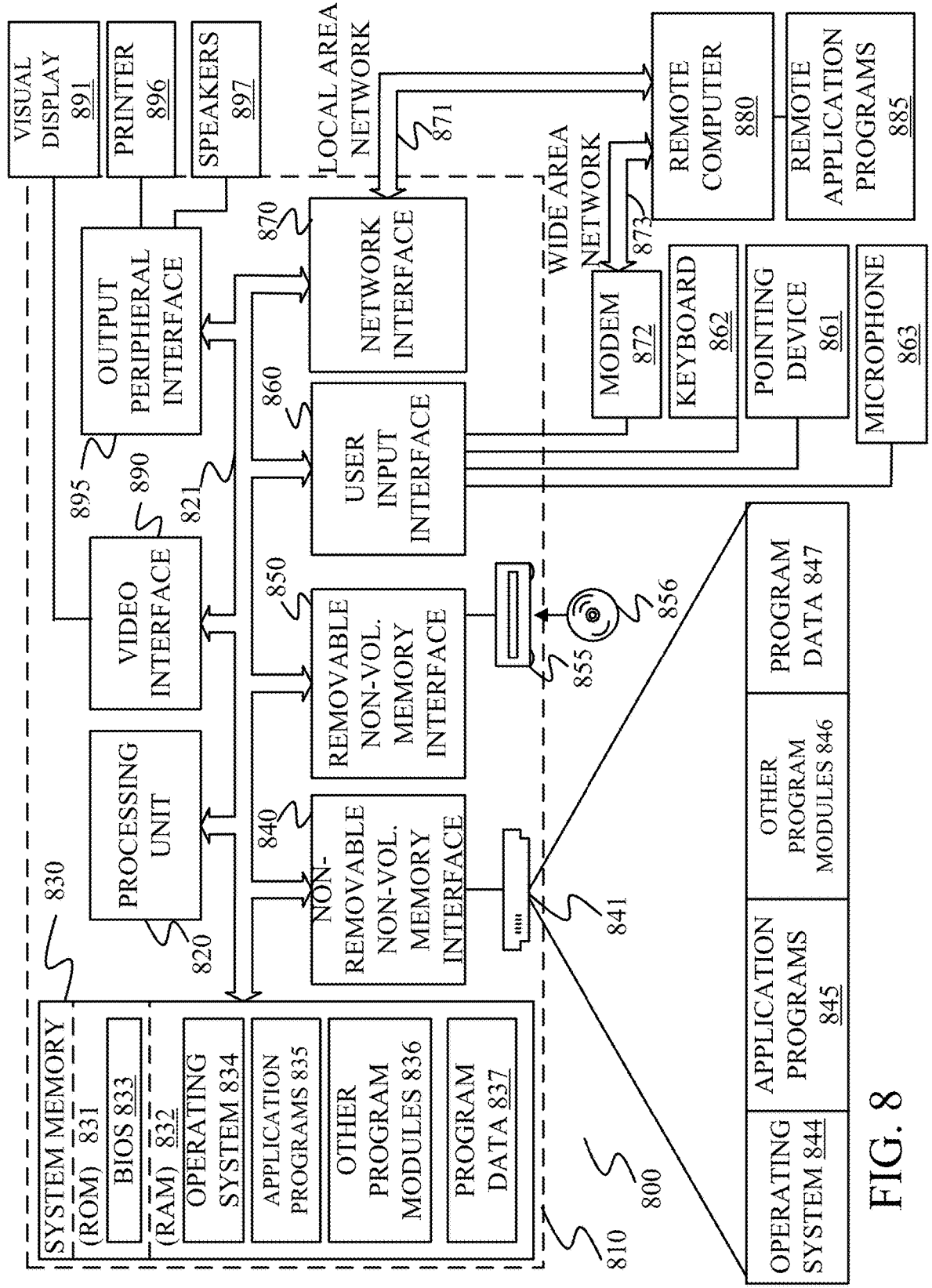
FIG. 8 is a block diagram of one example of a computing environment that can be used in the architectures shown in the previous figures.

FIG. 8 is one embodiment of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers 120, 160 or 172), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a location-based conversation system that generates a conversation display indicative of user messages, in a first location-based conversation, received from user devices in a geographic location corresponding to the first location-based conversation;

keyword generator logic that repeatedly detects keywords for the first location-based conversation based on a first usage frequency of linguistic units in the user messages in the first location-based conversation and based on a usage frequency of the linguistic units in other, related, location-based conversations; and keyword output logic that communicates the keywords to a data store storing the user messages in the first location-based conversation.

Example 2 is the computing system of any or all previous examples wherein each of the location-based conversations has a geographic location identifier identifying a corresponding geographic location.

Example 3 is the computing system of any or all previous examples wherein the keyword generator logic comprises:

geographically related conversation identifier configured to identify the related location-based conversations as location-based conversations having the same geographic location identifier as the first location-based conversation.

Example 4 is the computing system of any or all previous examples wherein the keyword generator logic comprises:

a message identifier that identifies a subset of the user messages in the first location-based conversation for which the first usage frequency is determined.

Example 5 is the computing system of any or all previous examples wherein the message identifier is configured to identify the subset of user messages as a set of most recently received user messages.

Example 6 is the computing system of any or all previous examples wherein the keyword generator logic comprises:

an operation detector configured to detect when the keywords are to be detected for the first location-based conversation.

Example 7 is the computing system of any or all previous examples wherein the operation detector comprises:

a new message detector configured to detect when a new user message is received in the first location-based conversation, the operation detector being configured to detect that the keywords are to be detected for the first location-based conversation when the new message detector detects that n new user messages are received in the first location-based conversation since the keywords were last detected.

Example 8 is the computing system of any or all previous examples wherein the keyword identifier logic comprises:

conversation parsing logic configured to parse the subset of user messages in the first location-based conversation into a first set of linguistic units; and term frequency generator logic configured to determine the first usage frequency for each of the linguistic units.

Example 9 is the computing system of any or all previous examples wherein the conversation parsing logic is configured to parse the geographically related conversations into linguistic units and wherein the keyword identifier logic comprises:

inverse conversation frequency generator logic configured to identify the usage frequency in the geographically related conversations for the linguistic units in the geographically related conversations.

Example 10 is the computing system of any or all previous examples wherein the first location-based conversation includes a corresponding title and further comprising:

title generator logic configured to modify the title of the first location-based conversation based on the keywords.

Example 11 is the computing system of any or all previous examples wherein the title generator logic comprises:

comparison logic configured to compare a current title corresponding to the first location-based conversation to the keywords; and title adjustment logic configured to adjust the current title based on the comparison.

Example 12 is a computer implemented method, comprising:

generating a conversation display indicative of user messages, in a first location-based conversation, received from user devices in a geographic location corresponding to the first location-based conversation;

repeatedly detecting keywords for the first location-based conversation based on a first usage frequency of linguistic units in the user messages in the first location-based conversation and based on a usage frequency of the linguistic units in other, related, location-based conversations; and communicating the keywords to user devices in the geographic location corresponding to the first location-based conversation.

Example 13 is the computer implemented method of any or all previous examples wherein each of the location-based conversations has a geographic location identifier identifying a corresponding geographic location, and wherein detecting keywords comprises:

identifying the related location-based conversations as location-based conversations having the same geographic location identifier as the first location-based conversation.

Example 14 is the computer implemented method of any or all previous examples wherein detecting keywords comprises:

identifying a subset of the user messages in the first location-based conversation; and identify the first usage frequency based on the identified subset of user messages.

Example 15 is the computer implemented method of any or all previous examples and further comprising:

detecting when a new user message is received in the first location-based conversation; and detecting that the keywords are to be detected for the first location-based conversation when n new user messages are received in the first location-based conversation since the keywords were last detected.

Example 16 is the computer implemented method of any or all previous examples wherein detecting keywords comprises:

parsing the subset of user messages in the first location-based conversation into a first set of linguistic units; and determining the first usage frequency for each linguistic unit in the first set of linguistic units;

parsing the geographically related conversations into linguistic units; and identifying the usage frequency in the geographically related conversations for the first set of linguistic units in the geographically related conversations.

Example 17 is the computer implemented method of any or all previous examples wherein the first location-based conversation includes a corresponding title and further comprising:

modifying the title of the first location-based conversation based on the keywords.

Example 18 is the computer implemented method of any or all previous examples wherein modifying the title comprises:

comparing a current title corresponding to the first location-based conversation to the keywords; and adjusting the current title based on the comparison.

Example 19 is a computing system, comprising:

a location-based conversation system that generates a conversation display indicative of user messages, in a first location-based conversation, received from user devices in a geographic location corresponding to the first location-based conversation, the first location-based conversation having a corresponding location identifier identifying the geographic location;

a geographically related conversation identifier configured to identify related location-based conversations as location-based conversations having a same geographic location identifier as the first location-based conversation; and keyword generator logic that repeatedly detects keywords for the first location-based conversation based on a first usage frequency of linguistic units in the user messages in the first location-based conversation and based on a usage frequency of the linguistic units in the related location-based conversations; and keyword output logic that communicates the keywords to a data store for the first location-based conversation.

Example 20 is the computing system of any or all previous examples wherein the first location-based conversation includes a corresponding title and further comprising:

title generator logic configured to modify the title of the first location-based conversation based on the keywords.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor; and memory storing instructions executable by the at least one processor, wherein the instructions, when executed, cause the computing system to:

receive geographic location information representing geographic locations of a first set of user devices;

based on the geographic location information, generate a first location-based conversation that includes a first set of user messages posted to a conversation thread by the first set of user devices in a first geographic location;

generate a first geographic location identifier that is associated with the first location-based conversation and represents the first geographic location;

generate a conversation display indicative of the first set of user messages posted to the first location-based conversation;

identify a second location-based conversation having a second geographic location identifier that identifies a second geographic location that corresponds to the first geographic location, the second location-based conversation including a second set of user messages posted to a conversation thread, separate from the first location-based conversation, by a second set of user devices located in the second geographic location;

determine a first usage frequency of linguistic units in the first set of user messages in the first location-based conversation;

determine a second usage frequency of the linguistic units in the second set of user messages in the second location-based conversation;

select a set of keywords based on the first and second usage frequencies; and communicate the set of keywords to a data store that stores the first set of user messages in the first location-based conversation and associates the set of keywords as searchable terms for the first location-based conversation.

2. The computing system of claim 1 wherein the instructions cause the computing system to:

identify the second location-based conversation as a geographically related conversation having the same geographic location identifier as the first location-based conversation.

3. The computing system of claim 2 wherein the instructions cause the computing system to:

identify a subset of the user messages in the first location-based conversation for which the first usage frequency is determined.

4. The computing system of claim 3 wherein the instructions cause the computing system to identify the subset of user messages as a set of most recently received user messages.

5. The computing system of claim 1 wherein the instructions cause the computing system to:

detect when the keywords are to be detected for the first location-based conversation.

6. The computing system of claim 5 wherein the instructions cause the computing system to:

detect when a new user message is received in the first location-based conversation; and detect that the keywords are to be detected for the first location-based conversation when the new message detector detects that new user messages are received in the first location-based conversation since the keywords were last detected.

7. The computing system of claim 3 wherein the instructions cause the computing system to:

parse the subset of user messages in the first location-based conversation into a first set of linguistic units; and determine the first usage frequency for each of the linguistic units.

8. The computing system of claim 7 wherein the instructions cause the computing system to:

parse the geographically related conversation into linguistic units; and identify the usage frequency in the geographically related conversation for the linguistic units in the geographically related conversation.

9. The computing system of claim 1 wherein the first location-based conversation includes a corresponding title and the instructions cause the computing system to:

modify the title of the first location-based conversation based on the keywords.

10. The computing system of claim 1 wherein the instructions cause the computing system to:

assign a value to each linguistic unit based on the second usage frequency, wherein a higher value is assigned to keywords that are used less frequently in the second location-based conversation than keywords that are used more frequently; and select the set of keywords based on the values assigned to the linguistic units.

11. A computer implemented method, comprising:

receiving geographic location information representing geographic locations of a first set of user devices;

based on the geographic location information, generating a first location-based conversation that includes a first set of user messages posted by the first set of user devices in a first geographic location;

generating a first geographic location identifier that is associated with the first location-based conversation and represents the first geographic location;

generating a conversation display indicative of the first set of user messages in the first location-based conversation;

identifying a second location-based conversation having a second geographic location identifier that identifies a second geographic location that corresponds to the first geographic location, the second location-based conversation including a second set of user messages received from user devices that are located in the second geographic location;

repeatedly detecting keywords for the first location-based conversation based on:

a first usage frequency of linguistic units in the first set of user messages in the first location-based conversation, and a second usage frequency of the linguistic units in the second set of user messages in the second location-based conversation; and communicating the keywords to user devices in the geographic location corresponding to the first location-based conversation and associates the keywords as searchable terms for the first location-based conversation.

12. The computer implemented method of claim 11 wherein detecting keywords comprises:

identifying the second location-based conversation as a geographically related conversation having the same geographic location identifier as the first location-based conversation.

13. The computer implemented method of claim 12 wherein detecting keywords comprises:

identifying a subset of the user messages in the first location-based conversation; and identify the first usage frequency based on the identified subset of user messages.

14. The computer implemented method of claim 13 and further comprising:

detecting when a new user message is received in the first location-based conversation; and detecting that the keywords are to be detected for the first location-based conversation when n new user messages are received in the first location-based conversation since the keywords were last detected.

15. The computer implemented method of claim 13 wherein detecting keywords comprises:

parsing the subset of user messages in the first location-based conversation into a first set of linguistic units; and determining the first usage frequency for each linguistic unit in the first set of linguistic units;

parsing the geographically related conversation into linguistic units; and identifying the usage frequency in the geographically related conversation for the first set of linguistic units in the geographically related conversation.

16. The computer implemented method of claim 11 wherein the first location-based conversation includes a corresponding title and further comprising:

modifying the title of the first location-based conversation based on the keywords.

17. The computer implemented method of claim 16 wherein modifying the title comprises:

comparing a current title corresponding to the first location-based conversation to the keywords; and adjusting the current title based on the comparison.

18. A computing system, comprising:

at least one processor; and memory storing instructions executable by the at least one processor, wherein the instructions, when executed, provide:

a location-based conversation system configured to generate a conversation display indicative of a first set of user messages in a first location-based conversation, wherein the first set of user messages comprises messages received from user devices that are located in a first geographic location corresponding to the first location-based conversation, the first location-based conversation having a first location identifier identifying the first geographic location;

a geographically related conversation identifier configured to identify a second location-based conversation as a location-based conversation having a second geographic location identifier that corresponds to the first geographic location identifier, the second location-based conversation including a second set of user messages received from user devices that are located in the second geographic location; and keyword generator logic configured to:

identify linguistic units in the first set of user messages in the first location-based conversation;

determine a usage frequency of the linguistic units in the second set of user messages in the second location-based conversation;

assign a value to each linguistic unit based on the usage frequency, wherein a higher value is assigned to keywords that are used less frequently in the second location-based conversation than keywords that are used more frequently; and generate a set of keywords based on the values assigned to the linguistic units; and keyword output logic configured to communicate the set of keywords to a data store for the first location-based conversation.

19. The computing system of claim 18 wherein the first location-based conversation includes a corresponding title and wherein the instructions, when executed, provide:

title generator logic configured to modify the title of the first location-based conversation based on the keywords.

* * * * *